3,057,696
APPARATUS FOR PRESSURE REDUCTION ON A
FLOWING SLURRY
Norman F. McLeod, Bartlesville, Okla., assignor to Phillips Petroleum Company, a corporation of Delaware
Filed Dec. 11, 1957, Ser. No. 702,083
7 Claims. (Cl. 23—260)

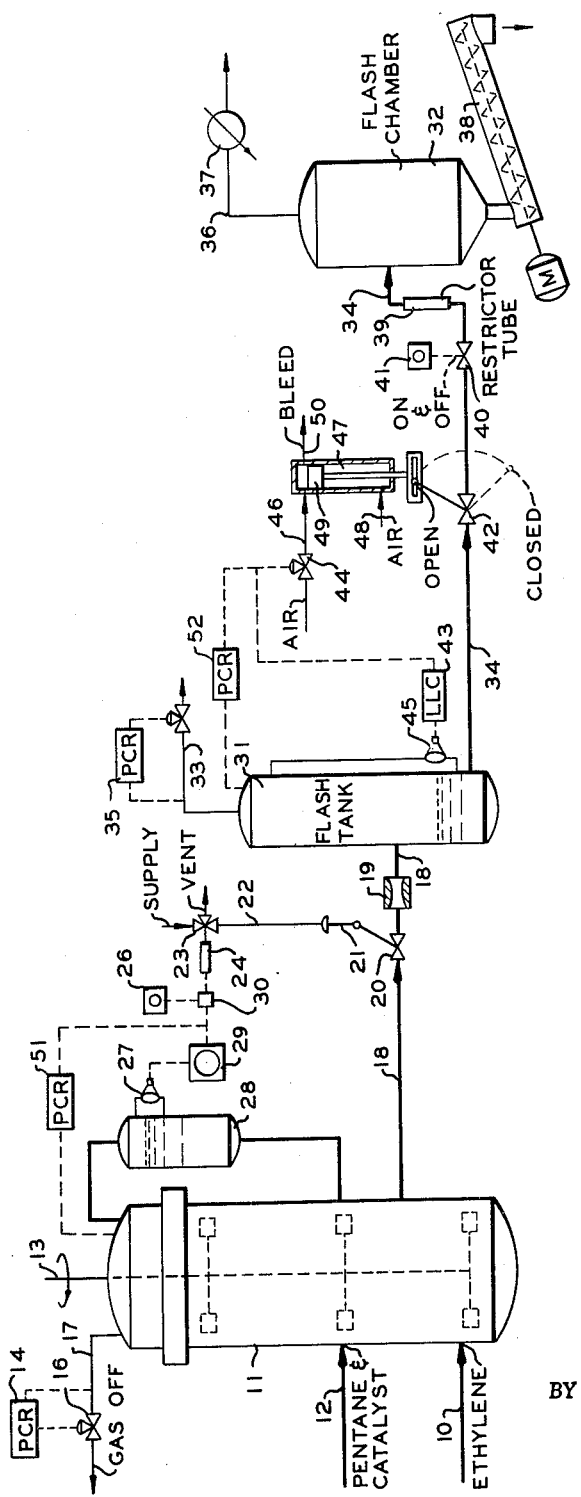

This invention relates to apparatus for transferring at a controlled rate a slurry of particulate solids in liquid media from a zone of elevated pressure to another zone of lower pressure. In one of its more specific aspects this invention relates to a flow control apparatus in a polymerization system.

In polymerization processes such as that described in the copending United States patent application of G. T. Leatherman and C. V. Detter, Serial No. 590,567, filed June 11 1956, the reaction mixture comprises a slurry of solid polymer particles in a liquid hydrocarbon diluent. The pressure in the reaction zone is generally that sufficient to maintain the liquid hydrocarbon diluent in the liquid phase and will ordinarily range from about 100 to about 700 pounds per square inch absolute. In continuous operation the reaction mixture is removed to a flash zone of lower pressure where unreacted gases are removed for reuse in the process. The slurry is then transferred to a secondary flash step wherein the diluent is removed prior to drying the polymer. This secondary flash step is normally conducted at atmospheric pressure. Transferring the polymer slurry from the reactor through the various stages of pressure reduction for removal of volatile materials presents a considerable problem in that conventional valves tend to become plugged by the polymer particles. Valve life also tends to be quite short because of the erosive nature of the slurry.

According to my invention an apparatus is provided which can satisfactorily be used to control the rate of flow of a slurry from a zone of high pressure to one of lower pressure without the problems of valve plugging and wear which normally accompany such an operation. I have found that a slurry of particulate solids in liquid media can be removed from a zone of relatively high pressure to a zone of lower pressure on a continuous basis through a conduit which has therein a fixed restriction sized to provide the required pressure drop at full line flow, with a full opening valve in the conduit which is actuated in a repeating timed cycle to either a fully opened or fully closed position, and means for stopping or starting the flow of the slurry through the conduit in response to one of the variables in the high pressure zone selected from the group consisting of pressure and liquid level. This latter means can be an overriding control which locks the above-mentioned valve in either the fully opened or fully closed position in response to high or low liquid level or pressure, or, alternatively, it can be a separate valve in the conduit operating independently from the first valve and fully opening or fully closing in response to either the liquid level or pressure in the high pressure zone. The apparatus of my invention thus enables the use of large-sized valves which are operated either fully opened or fully closed and thereby reduces possibility of plugging and wear. The line restriction which can suitably be a venturi, restrictor tube, a length of smaller internal diameter line, or the like, is a necessary element in combination with the valves and controls in the apparatus of my invention, so that the required pressure drop in the line is provided without dependence upon the valves, and flow is controlled so that a minimum speed is required for the repeating timed cycle on which the valve operates.

It is an object of my invention to provide a method of removing a slurry from a high pressure zone on a continuous basis and with controlled flow.

It is another object of my invention to reduce the plugging problem in conduits designed to carry slurry from a high pressure zone to one of lower pressure.

It is still another object of my invention to reduce the amount of erosion of valves which normally accompanies the control of a flowing slurry.

Still another object is to provide a control system for controlling the flow of a polymerization reactor effluent from a high pressure stage in the operation to one of lower pressure wherein the polymerization reactor effluent comprises a slurry of solid polymer particles in a liquid hydrocarbon diluent.

Other objects, advantages and features of my invention will become apparent to those skilled in the art upon study of the following description and appended drawing.

A more complete understanding of the invention can be obtained by referring to the accompanying drawing which shows schematically a polymerization system including reactor and first and secondary flash stages with two separate embodiments of my invention employed to control the flow of slurry, first, from the reactor to a primary flash tank and, secondly, from the primary flash tank to a secondary flash chamber.

While this invention is described primarily in relation to a polymerization process and it is of particular advantage in controlling the flow of slurry wherein the solid particles are polymer, it is also of advantage in processes involving any slurry of solid particulate matter in liquid media where the problems of wear and plugging would be encountered.

Referring now to the drawing, apparatus is shown for the catalytic polymerization of ethylene in the presence of pentane as the diluent. Ethylene is fed continuously through line 10 into reactor 11. Pentane containing solid catalyst in suspension is likewise fed continuously to the reactor through line 12. The reactor is equipped with agitator 13 and suitable heat exchange means, not shown. Pressure in the reactor is controlled by pressure recorder controller 14 operating valve 16 in line 17 to release gas from the reactor if pressure becomes too high. As the polyethylene is formed in the reactor, the polymer slurry in the pentane diluent is formed and is removed from the reactor through line 18 on a continuous basis. While the flow through line 18 is not steady, it is maintained at a regular, pulsating rate in sufficient volume to permit the liquid level in reactor 11 to remain substantially constant.

In line 18 flow is controlled by venturi 19, which provides most of the pressure drop, and by full opening valve 20. By "full opening valve" I mean to designate a valve which is operated in either the fully opened or fully closed position. Valves of this type include plug valves and ball valves, such as those manufactured by the Jamesbury Corporation of Worcester, Massachusetts. This type of valve is used in the apparatus of my invention since it offers no restriction to flow when in an open position, thereby eliminating flashing and substantially obviating valve erosion because of the short contact time of the moving valve parts with the flowing materials. Valve 20 is a power-operated valve and is actuated by driving means 21 which can be an air cylinder, as subsequently described, or an electrically operated driving means. In the embodiment illustrated driving means 21 is an air cylinder powered by an air supply through air line 22. Valve 20 is biased to a normally closed position and is opened by operating three-way valve 23 to supply air to driving means 21. Three-way valve 23 is operated by solenoid 24 which, in turn, is actuated by repeating cycle timer 26.

The repeating cycle timer can be any instrument which emits a signal for a timed interval after a timed delay in a repeating unchanged cycle. Suitable commercially available instruments of this type are the "Flexopulse" manufactured by Eagle Signal Corporation of Moline, Illinois, and described on page 7 of this company's Bulletin No. 291, issue 3; or the "Flex-O-Timer" manufactured by Taylor Instrument Company of Rochester, New York, and described in this company's Bulletin 98350 of August 1954. Repeating cycle timer 26 can be set to activate solenoid 24 and, in turn, open valve 20 for any number of seconds during a timed interval. For example, timer 26 can be set to open valve 20 for two seconds and allow it to remain closed for eight seconds, repeating the cycle every ten seconds. When solenoid 24 is inactivated, three-way valve 23 returns to its normal position venting air cylinder 21 and permitting valve 20 to close.

Liquid level in reactor 11 is maintained within predetermined limits by liquid level sensing means 27 on vessel 28 in communication with reactor 11. Liquid level sensing means 27 communicates through controller 29 which overrides timer 26. For example, when the liquid level in the reactor is too low, controller 29 breaks the circuit in switch 30 thereby disconnecting timer 26 and allowing valve 20 to remain closed for the full period of the cycles. When the liquid level returns to its normal position, switch 30 is closed and timer 26 again controls the rate of flow of effluent from the reactor. If the liquid level should become too high, controller 29 can be set to short circuit timer 26 and activate solenoid 24 thereby opening valve 20 until the liquid level returns to normal.

As an alternative arrangement, timer 26 can be set to operate at such a rate that the liquid level in the reactor is prevented from increasing, that is, the effluent stream under normal conditions is slightly in excess of the reactor feed. With this arrangement a low level in the reactor would serve to disconnect timer 26, as previously described, and a high level would reconnect timer 26 and place the operation of valve 20 back on the timed cycle. With this arrangement the flow of slurry from reactor 11 can be controlled quite accurately with a full opening valve and the possibility of plugging in line 18 is substantially reduced.

An alternative embodiment of my invention is illustrated in the same drawing to control the flow of slurry from flash tank 31 to flash chamber 32. Flash tank 31 is maintained at a pressure substantially less than that employed in the reactor. Unreacted monomer is flashed to vapor in tank 31 and is removed for reuse in the process through line 33. The pressure in tank 31 is maintained by pressure controller recorder 35 operating a valve in line 33. The remaining slurry of polymer and diluent is removed continuously from tank 31 through line 34, passing to flash chamber 32 which is operated at atmospheric pressure. The diluent is flashed to vapor in chamber 32 and is removed overhead through line 36 and condensed in heat exchanger 37. The solid, particulate polymer falls from chamber 32 into conveyor-dryer 38 from which the polymer product is removed for further processing in any manner desired.

Flow of slurry from tank 31 to chamber 32 is controlled by the apparatus of my invention as follows. Pressure drop between tanks 31 and 32 is provided by restrictor tube 39 sized to maintain the desired pressure drop under conditions of maximum flow through line 34. Flow through line 34 is controlled by full opening valve 40 which, in turn, is operated by repeating cycle timer 41 in a manner such as previously described. In this embodiment valve 40 is permitted to operate on an unchanging basis under control of timer 41 and the liquid level in flash tank 31 is maintained by opening or closing full opening valve 42.

Liquid level sensing means 45 on tank 31 communicates with liquid level controller 43 which controls the operation of valve 44 in air line 46. Valve 42 is operated by driving means 47 which is shown in the drawing as an air cylinder. Valve 42 is biased in the open position by a low pressure air source 48. This biasing means could also be a spring which holds the piston 49 in cylinder 47 in the position required to maintain valve 42 open. Valve 42 is closed when the liquid level in tank 31 reaches a low stage and controller 43 opens valve 44 admitting air to cylinder 47. High pressure air in line 46 thus closes valve 42 until a high liquid level is indicated by sensing element 45. Valve 44 is then closed and the high pressure air vents from cylinder 47 through bleed line 50. Air is permitted to vent continuously through line 50 as controlled by a needle valve, not shown, but at a rate insufficient to prevent operation of the valve by the high pressure air in line 46.

In this embodiment timer 41 is set to drain tank 31 by permitting flow through line 34 when valve 42 is open to be slightly in excess of flow through line 18. Valve 42 is closed when the liquid level becomes too low and is opened again permitting flow to be controlled by valve 40 when the liquid in tank 31 reaches a high level. As can be seen, the second embodiment described replaces electrical circuitry of the first embodiment with an additional valve which is operated in either the fully opened or fully closed position.

As an alternative to the embodiments described above, either or both of the liquid level sensing means and controllers can be replaced with pressure sensitive elements cooperating with pressure controllers 51 and/or 52. These controllers are set to operate within a pressure range below the maximum pressure to which pressure controllers 14 and 35 are set to respond. High and low pressures in vessels 11 and 31 can thus be employed in place of high and low liquid levels, respectively, to operate the apparatus described.

To further demonstrate the operation of the apparatus of my invention the following example is presented which should be considered as illustrative only and not interpreted to limit my invention unduly.

A slurry of particulate polyethylene as above-described in pentane diluent was passed from a monomer flash chamber operated at 50 pounds per square inch absolute to a drying zone operated at atmospheric pressure in which the pentane diluent was flashed. The slurry of polyethylene and pentane was passed through a one-half inch I.D. steel pipe having two fast-acting Jamesbury ball valves serially arranged therein and thence through a flow restriction consisting of 20 feet of one-half inch O.D. copper tubing. The internal cross sectional area ratio of the pipe to tubing was about 2 to 1. The first valve was operated by a double-acting air piston which in turn was controlled by a level controller on the monomer flash chamber. The first valve was opened at a high level signal from the level controller and closed by a low level signal from the controller. The second valve was operated by a Flexopulse timer on the continuous cycle of one second open and nine seconds closed. The flow of slurry was thereby controlled accurately on a continuous basis while maintaining the pressure in the monomer flash chamber substantially higher than that in the drying zone. The valves controlling the flow of slurry were operated in either the fully opened or fully closed position thereby minimizing wear and the possibility of polymer plugging the valves.

As will be evident to those skilled in the art, various modifications of this invention can be made, or followed, in the light of the foregoing disclosure and discussion, without departing from the spirit or scope thereof.

I claim:

1. In apparatus comprising a vessel adapted to contain under pressure a slurry of particulate solids suspended in liquid media, said vessel having an inlet and outlet, and a conduit connected to said outlet, means for controlling the rate of flow of said slurry through said conduit comprising, in combination, a fixed restriction in said conduit, a full opening valve in said conduit between said restriction and said vessel, a repeating cycle timing mechanism controlling the operation of said valve exclusively in fully open and fully closed positions, and automatic control means overriding said timing mechanism for fully opening and fully closing said valve in response to high and low values respectively of one of the variables in said vessel directly affected in inverse proportion to the flow rate of material from said vessel.

2. In apparatus comprising a vessel adapted to contain under pressure a slurry of particulate solids suspended in liquid media, said vessel having an inlet and an outlet, and a conduit connected to said outlet, means for controlling the rate of flow of said slurry through said conduit comprising, in combination, a fixed restriction in said conduit, a first full opening valve in said conduit between said restriction and said vessel, a repeating cycle timing mechanism automatically controlling the operation of said first valve exclusively in fully open and fully closed positions toward draining said vessel, a second full opening valve in said conduit, and means for fully opening and fully closing said second valve in response to high and low values respectively of one of the variables in said vessel directly affected in inverse proportion to the flow rate of material from said vessel.

3. Apparatus according to claim 2 wherein said means for fully opening and fully closing said second valve is sensitive to pressure within said vessel and controls said second valve in response thereto.

4. Apparatus according to claim 2 wherein said means for fully opening and fully closing said second valve is sensitive to liquid level within said vessel and controls said second valve in response thereto.

5. In apparatus comprising a vessel adapted to contain under pressure a slurry of particulate solids suspended in liquid media, said vessel having an inlet and an outlet, and a conduit connected to said outlet, means for controlling the rate of flow of said slurry from said vessel through said conduit to a zone of lower pressure comprising, in combination, a venturi in said conduit, a first full opening valve in said conduit between said venturi and said vessel, power operated means for fully opening and fully closing said first valve, a repeating cycle timing mechanism adapted to actuate said power operated means to open fully said first valve for a regular predetermined interval which is set to avoid increase in liquid level in said vessel, a second full opening valve in said conduit between said vessel and said first valve said second valve normally being held in fully open position, a liquid level detector on said vessel, means for producing an output associated with said detector in response to a low liquid level in said vessel, and means for closing said second valve in response to said output.

6. In a polymerization system comprising a reactor, a primary flash tank, a secondary flash vessel, a first conduit connecting said reactor and said tank, and a second conduit connecting said tank and said vessel, said reactor, tank, and vessel being adapted to operate at progressively decreasing pressure, apparatus for controlling the flow of slurry of particulate polymer solids in liquid media in order to minimize blocking in said conduits comprising, in combination, a first fixed restriction in said first conduit, a first full opening power operated valve in said first conduit said first valve being biased in the closed position, a first repeating cycle timing mechanism adapted to actuate said first valve automatically to the fully open position for a regular predetermined interval, high and low liquid level sensing means on said reactor, first control automatic means responsive to said high and low liquid level sensing means overriding said first timing mechanism and adapted to actuate said first valve to the fully open position in response to high level and to disconnect said first timing mechanism from said first valve in response to low level in said reactor, a second restriction in said second conduit, a second full opening, power operated valve in said second conduit said second valve being biased in the closed position, a second repeating cycle timing mechanism adapted to actuate said second valve to the fully open position for a regular predetermined interval sufficient to avoid increase in liquid level in said tank, a third full opening, power operated valve in said second conduit said third valve being biased in the fully open position, a low liquid level sensing means on said tank, and second automatic control means responsive to said low liquid level sensing means adapted to actuate said third valve to the closed position in response to low level in said tank.

7. Apparatus according to claim 2 wherein said fixed restriction is a length of said conduit which has a smaller internal diameter than the upstream portion of said conduit.

References Cited in the file of this patent

UNITED STATES PATENTS

| | | |
|---|---|---|
| 2,416,875 | Kehoe | Mar. 4, 1947 |
| 2,562,315 | Kempton | July 31, 1951 |
| 2,568,506 | Mercer | Sept. 18, 1951 |
| 2,653,620 | Morgan | Sept. 29, 1953 |
| 2,808,316 | Hall | Oct. 1, 1957 |
| 2,863,737 | Green | Dec. 9, 1958 |